(12) United States Patent
Sena et al.

(10) Patent No.: US 8,245,666 B2
(45) Date of Patent: Aug. 21, 2012

(54) BIRD FEEDER WITH RETRACTABLE FEEDER BODY

(76) Inventors: Kim A. Sena, Ada, MI (US); Jeffrey A. Ellen, Marne, MI (US)

(*) Notice: Subject to any disclaimer, the term of this patent is extended or adjusted under 35 U.S.C. 154(b) by 30 days.

(21) Appl. No.: 12/787,589

(22) Filed: May 26, 2010

(65) Prior Publication Data

US 2010/0300364 A1    Dec. 2, 2010

Related U.S. Application Data

(60) Provisional application No. 61/216,964, filed on May 26, 2009.

(51) Int. Cl.
*A01K 39/01* (2006.01)
(52) U.S. Cl. ...................................................... 119/57.8
(58) Field of Classification Search .............. 119/51.01, 119/52.2, 52.3, 53, 57.8, 52.4; 248/327–329, 248/330.1, 318
See application file for complete search history.

(56) References Cited

U.S. PATENT DOCUMENTS

| 1,891,042 | A | * | 12/1932 | Benoit | 119/52.1 |
| 2,804,844 | A |   | 5/1955  | Gigliotti | |
| 3,117,554 | A | * | 1/1964  | Taylor | 119/52.3 |
| 3,301,217 | A |   | 2/1965  | Prowinski | |
| 5,289,796 | A |   | 3/1994  | Armstrong | |
| 6,401,658 | B1 |  | 6/2002  | Teets | |
| 7,370,607 | B2 | * | 5/2008 | O'Dell | 119/52.3 |
| 7,930,994 | B2 | * | 4/2011 | Stone et al. | 119/52.1 |
| 2008/0022936 | A1 | * | 1/2008 | Stone et al. | 119/52.2 |
| 2009/0283044 | A1 | * | 11/2009 | Black | 119/51.01 |

* cited by examiner

*Primary Examiner* — Kristen C Hayes
(74) *Attorney, Agent, or Firm* — Gardner, Linn, Burkhart & Flory, LLP (57) ABSTRACT

A novel bird feeder is disclosed comprising a top portion with a hook, a cap and shield, and a bottom portion with a feeder body and a tray the top portion and the bottom portion being interconnected by a cable. One end of the cable is affixed to the bottom portion of the bird feeder and the other end of the cable is attached to a spring biased coil assembly located in the top portion. The bottom portion is then reversibly dislocatable from the top portion between an in-use condition and a re-supply condition.

18 Claims, 10 Drawing Sheets

BIRD FEEDER WITH RETRACTABLE FEEDER BODY

RELATED APPLICATIONS

This application is related to Provisional Patent, No. 61/216,964 filed on May 26, 2009.

STATEMENT REGARDING GOVERNMENTALLY FUNDED WORK

Not applicable.

BACKGROUND OF THE INVENTION

The present invention relates to bird feeders. More particularly, the present invention relates to bird feeders with retractable feeder bodies for the purpose of accessibility for filling.

Bird feeders are one of the most popular lawn and garden accessories and are well known to birding aficionados. In the usual case, a bird feeder comprises a body for holding bird feed, where the body has some number of holes or slots for the distribution of the bird food. Since bird food is usually a variety of seeds (as compared to suet or peanut butter or the like) the food is easily distributed through such apertures. In addition to the body, the bird feeder typically has some sort of apparatus for supporting it at height in order to place the food in a location desirable for the birds and away from predators lurking on the ground. Sometimes such feeders include design attributes for protecting access to the bird food from squirrels and other seed eaters, such design attributes including shields, baffles, barriers and the like.

Given the traditional approach to bird feeders and to bird feeding in general, certain long standing problems have emerged that are addressed in the present invention. One chief problem is the contamination of the bird feeder itself with bird feces or droppings. Bird feces are problematic for a number of reasons including health, staining, and just the unpleasantness of dealing with the substance. Bird feces are not as dangerous as the waste from other animals but accumulations can be sources for pathogens such as histoplasmosis, and cryptococcosis not to mention other threats to human health. Direct contact with bird feces is advised and in the typical bird feeder this is difficult when the user is attempting to re-supply the feeder with food. In many bird feeder designs the user may have to open the feeder up by grasping the top of the unit which is usually the most contaminated. In other designs the sides of the unit can be fouled as well. Thus it is a very important issue (supported by consumer surveys) for the user to have a bird feeder that avoids the need for direct contact with soiled surfaces.

Another problem associated with typical bird feeders is the re-supply procedure for the filling the feeder with bird food, e.g. seed. Many times (as mentioned above) the user may be compelled to open up the top of the bird feeder in order to refill it. Depending on the manner in which the feeder has been installed, this can be a dicey proposition especially if it requires the use of a ladder or stool. Even without the need for a ladder or stool, the feeder is usually at or above chest height meaning that the feed has to be raised to that level and poured into the feeder. For many people this can be difficult and even dangerous if one is suffering from arthritis or rotator cuff problems or the like since the ergonomic considerations for this approach are horrifically wrong. The lifting issues aside, the ability to control the amount of feed being dispensed is made more difficult through this approach as well, leading to the loss of seed/food through accidental overfilling at times.

One of the ways the foregoing problems have been handled in the prior art has been through the use of bird feeders that have feeder bodies that separate and which can be lowered for re-supply purposes and then retract back to their normal position. Examples of these are well known although the prior art bird feeders have not been completely satisfactory and at times expose users to the bird feces, or substantially increase the weight of the bird feeder, or make it difficult for a user to access the feeder body. These and other deficits in bird feeder designs have left the consumer with a less than perfect solution.

Approaches that have been taken in the prior art include Gigliotti (U.S. Pat. No. 2,804,844) where a bird feeder is mounted onto a vertical post and parts of the bird feeder assembly, such as the roof, feeder body (hopper) and platform can slide vertically on the vertical post. This allows the user the ability to gain access to the feeder body for re-supply purposes when the roof is moved upwards on the vertical post. In this instance, however, the access is restricted and requires the user to contort his/herself in order to conduct the re-supply.

Another approach is typified by Stone (Patent Application No. 2008/0022936) where the bird feeder has a cable running centrally through the longitudinal axis of the bird feeder. One end of the cable is affixed to an anchor point for suspending the bird feeder in the appropriate location. The other end of the cable is affixed to a spring coil assembly that rolls the cable up onto a spool located in the base of the feeder. Thus the user can grasp the base of the feeder and pull it down, thereby overcoming the spring biased on the spool, playing out cable as the bird feeder is brought down to a height where the user can access the unit. In this approach the user still has to remove the top portion of the feeder to provide access for re-supply. In addition, it appears that the user will also be confronting the real likelihood of exposure to bird feces when pulling down the design as presented. Further, the bird feeder approach of Stone locates the cable and coil assembly within the bottom of the feeder, with the effect that the whole feeder assembly is supported entirely by the spring biased coil assembly. This undue burden on the coil assembly makes it difficult to calibrate the spring bias to cover the conditions when the feeder is loaded with food and when its empty and it also decreases the lifetime of the coil assembly as the spring bias becomes fatigued over time. This leads to earlier failures of the Stone bird feeder and with the prospect that the user will be looking to replace the coil assembly (or components therein) or to merely find another bird feeder altogether. Lastly, the pathway for the cable in Stone requires that it be routed through a centrally located tube running axially through the center of the feeder body. The cable will wear on the tube over time which not only leads to pre-mature failure of the unit, but it means that fragments of the tube and the cable will be ejected into the food supply contained within the feeder body. This unnecessary contamination of the bird food is a contradiction for the users who have purchased the feeders for the benefit of the birds in the first instance.

While the prior art devices have addressed some problems associated with bird feeding and bird feeders, the approaches are not as effective as the methods of the present invention. The objectives long sought by users in the hobby of bird feeding are not solved by the approaches taken in the prior art and it is asserted that the methods and practices of the present invention achieve, for the first time, these long sought after objectives.

SUMMARY OF THE INVENTION

A novel bird feeder in accordance with the present invention is comprised of a top portion and a bottom portion, where the top portion includes a hook, cap and shield, and the bottom portion includes a feeder body and a tray. The top portion and the bottom portion of the bird feeder are interconnected by a cable that is anchored at one end to the bottom portion and which is attached at the other end to a spring biased coil assembly installed in the top portion; said coil assembly including a spool for spooling the cable. The hook on the top portion of the bird feeder is attached to a fixed point for locating the bird feeder. The bottom portion of the bird feeder may then be pulled by a user between an in-use and a re-supply condition with the cable being spooled and unspooled respectively. The in-use condition is the condition where the bird feeder is ready for birds and the top portion and the bottom portion are in aligned contact with each other. In the re-supply condition the feeder body is separated from the top portion and is accessible to a user for filling the feeder body with bird seed.

The bottom portion of the bird feeder in the first embodiment further includes a ring that is attached to the tray and which is positioned for the user to grasp said ring when he/she seeks to move the bird feeder to the re-supply condition. The ring is also located underneath the tray out of the area where bird feces may accumulate.

In the preferred embodiment, the coil assembly is located in the top portion. The cable is attached to a tube centrally located along the longitudinal axis of the feeder body and in the area of the feeder body top, where it is attached to cable supports that are perpendicularly oriented and attached to the inside of the feeder body flush with the feeder body top.

In another embodiment of the present invention, the bird feeder is comprised of a top portion and a bottom portion, where the top portion includes a hook, cap and shield, and the bottom portion includes a feeder body, a tray and a base. The top portion and the bottom portion of the bird feeder are interconnected by a cable that is anchored at one end to the top portion and which is attached at the other end to a spring biased coil assembly installed in the base; said coil assembly including a spool for spooling the cable. The hook on the top portion of the bird feeder is attached to a fixed point for locating the bird feeder. The bottom portion of the bird feeder may then be pulled by a user between an in-use and a re-supply condition with the cable being spooled and unspooled respectively. The in-use condition is the condition where the bird feeder is ready for birds and the top portion and the bottom portion are in aligned contact with each other. In the re-supply condition the feeder body is separated from the top portion and is accessible to a user for filling the feeder body with bird seed.

The foregoing descriptions of the preferred embodiments briefly illustrate the attributes of the present invention. The benefits and features of the present invention are disclosed in more detail below.

DETAILED DESCRIPTION OF THE PREFERRED EMBODIMENTS

The bird feeder of the present invention is of the type that separates into two parts for servicing, namely, when the user desires to re-supply the feeder with bird seed. The classic design for a bird feeder inherently conflicts with convenient usage. Notably, many bird feeders have a feeder body, or hopper, where the bird seed is stored. The feeder body typically has portals or slots for the distribution of the bird seed. Lastly, common bird feeders employ tops that extend well beyond the feeder body and corresponding have perches or trays that extend beyond the feeder as well. Both serve to keep competitors such as squirrels or ground hogs away from the feeder body and the top can also serve to shield the distributed seed from rain and bird droppings. Thus when the user has to service the feeder, access to the feeder body is similarly restricted and requires the removal or dislocation of the top, or the feeder body, or some combination thereof in order to gain clearance to re-supply the seed.

In the present invention, two major problems are resolved, and several other improvements are made to the usual bird feeder design. Two immediate goals, protection of the user from contamination and ease of use for re-supply have been attained in the present invention, both of which differentiate the applicants' version from the prior art. There are additional attributes that enhance the functionality of the present invention as well and these features will be explained in detail.

Figure 1:
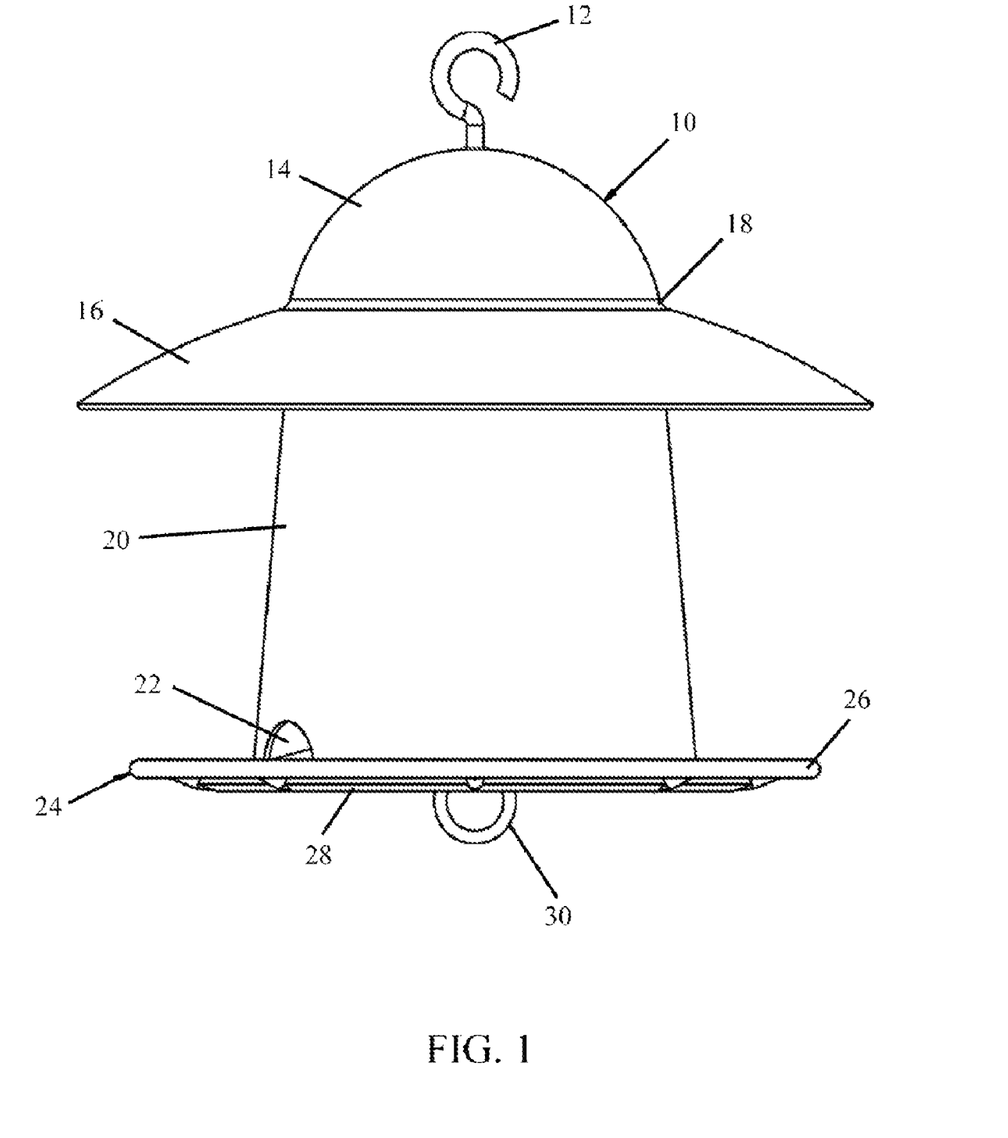
FIG. 1 is a front elevational view of a bird feeder of the present invention in the in-use condition.
Figure 2:
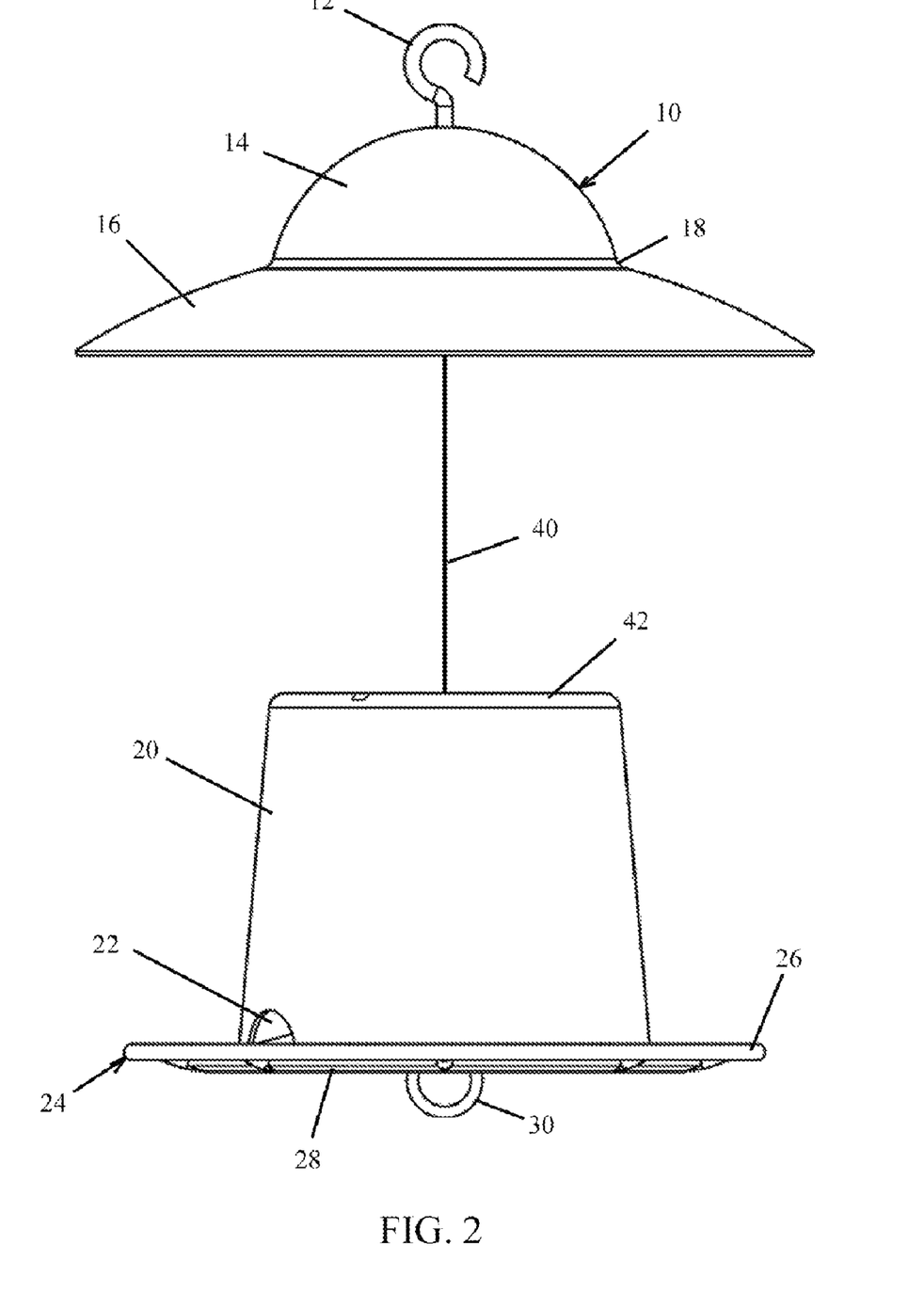
FIG. 2 is a front elevational view of the bird feeder of FIG. 1 shown in the re-supply condition.

Turning now to the drawings, in FIGS. 1 and 2, a bird feeder 10 of the present invention is shown with hook 12, cap 14, shield 16 and junction 18. Below this the feeder body 20 is disclosed with the feed port(s) 22, the tray 24, the perch 26, the tray base 28, and the ring 30. FIG. 2 also shows the cable 40. As shown in FIG. 1, the bird feeder is in the "in-use" condition which will be defined in more detail below. With respect to FIG. 2, the bird feeder is shown in the "re-supply" condition.

Figure 3:
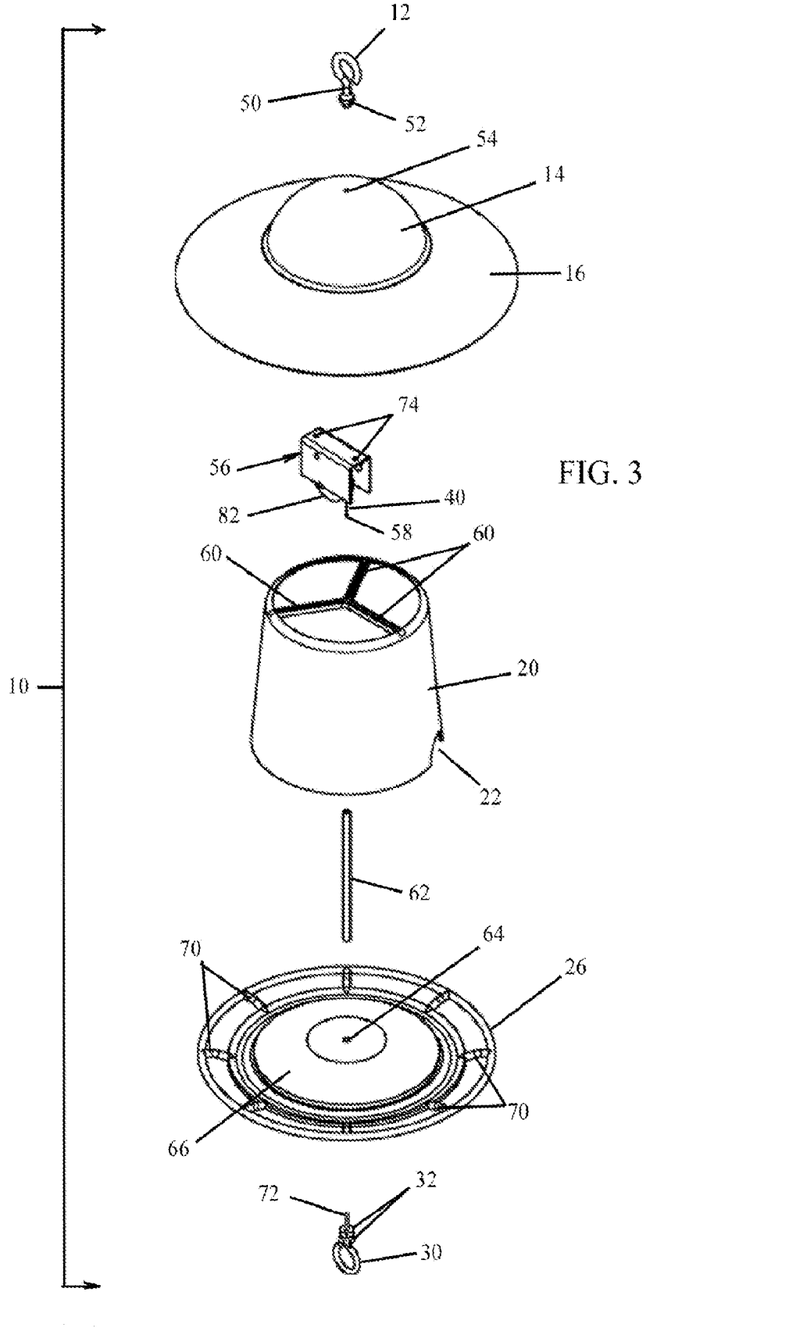
FIG. 3 is an isometric exploded view of one version of the preferred embodiment of the bird feeder of FIG. 1, showing the overall assembly of the main components.
Figure 4:
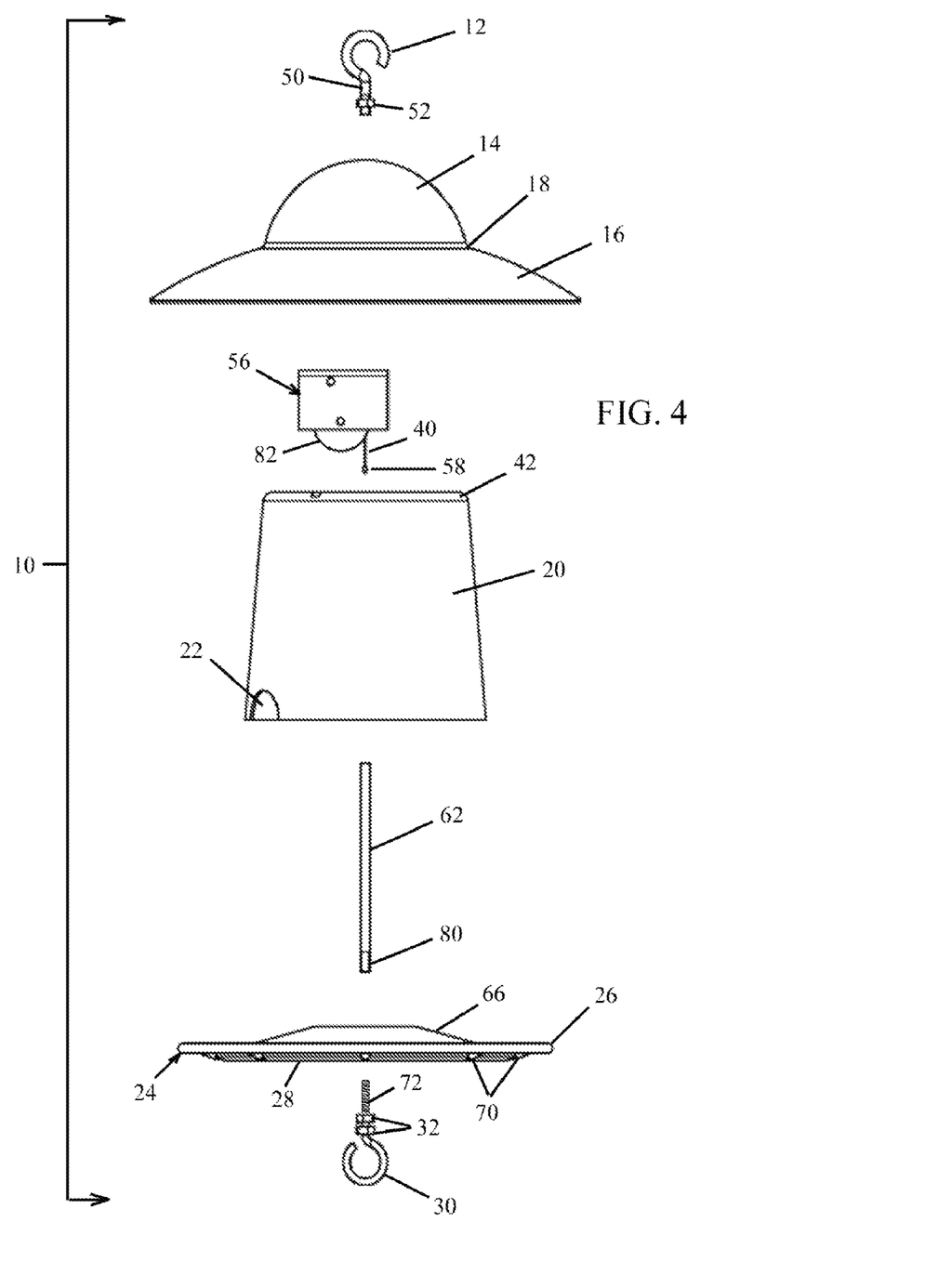
FIG. 4 is a front exploded view of the bird feeder of FIG. 3 showing the details of some of the components.
Figure 5:
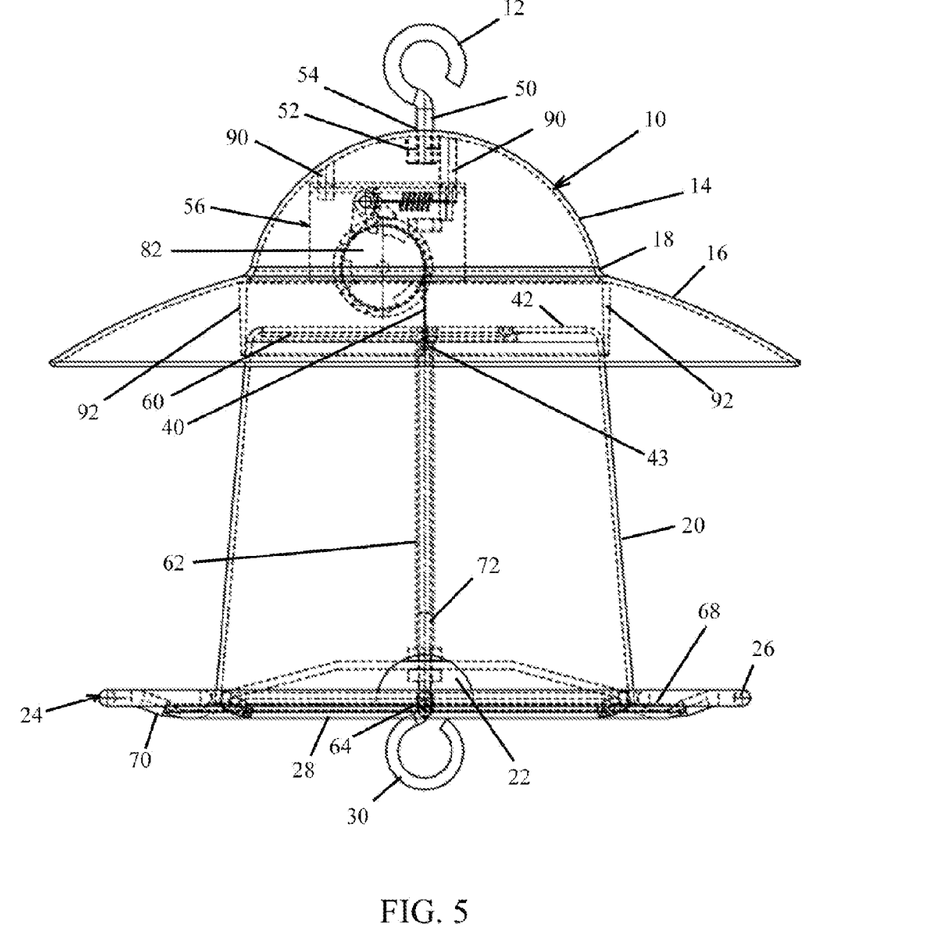
FIG. 5 is a front elevational view of the bird feeder of FIG. 3, in the in-use condition and with the internal components shown by hidden lines.

In FIGS. 3 and 4, the internal portions of the bird feeder 10 are shown with more detail and include the ring nuts 32, cable 40, the feeder body top 42, shank 50, hook thread 52, hook hole 54, coil assembly 56, cable end 58, cable support(s) 60, tube 62, ring hole 64, feeder pan 66, trough 68, perch supports 70, ring end 72, coil assembly mounting holes 74, tube end 80 and cable spool 82. Internal details of the bird feeder 10 are disclosed in FIGS. 5, 6, and 7 and include coil assembly mounts 90, the cap seat 92, support junction 43, cable anchor 100, and cable yoke 102.

The bird feeder of the present invention distributes bird seed in the same way as conventional feeders do; through the use of a hopper (feeder body) and feed ports. The seed is allowed to flow by gravity from the feeder body out the feed ports and into the trough. Birds attracted to the feed can land on the perch, which is substantially a circumferential ring that is supported by the perch supports on the periphery of the tray.

To install the bird feeder in a location to attract birds, the hook located on the top portion of the bird feeder, specifically on the cap projecting upwards, is used to hang the bird feeder from a suitable tree limb, shepherd's hook, or other support, such that the bird feeder is free of obstructions to the perch and typically high enough from the ground to deter predators such as house cats or dogs. The function of the present invention is intended to be compatible with the typical placement of bird feeders and in fact facilitates the placement by allowing for easier access to the feeder body, as will be understood.

In the preferred embodiment, the bird feeder is comprised of two main portions; the top portion and the bottom portion. The top portion includes, among other components, the hook, the cap, the shield, the coil assembly and the cap seat. The bottom portion includes, among other components, the feeder body, the tube, the cable supports, the tray, and the ring. The top portion is interconnected to the bottom portion by the cable where it is anchored at the cable yoke located at the top of the tube. The cable end has the cable anchor located thereon and provides an attachment point for preventing the cable from slipping through the cable yoke. The cable yoke and the tube are further stabilized and supported by the cable supports which extend from the tube top to points along the inner side of the feeder body top as can be seen in the drawings. As can be seen in the drawings, the tube includes the tube end which is identified and which is typically intended to carry an internal thread for engagement with the ring end. This fixes the lower end of the tube to the tray. The purpose of the cable supports is to buttress the tube and the cable yoke in order to provide a secure point for retaining the cable anchor. It should also be understood that the components of the top portion and bottom portion are fixed together within each portion, either as parts of the same injection molding (cap, junction, shield) or by gluing or welding.

The other end of the cable is affixed to the coil assembly, specifically to the spool which has a length of cable wound thereon. The coil assembly is a spring biased roll-up type, sometimes known as a window shade spool, and is a conventional component well known in the art. As such it is identified in the drawings although the specific components of the coil assembly are not disclosed since these do not comprise a specific part of the present invention. The coil assembly is mounted to the underside of the cap by way of the coil assembly mounts. The coil assembly can be screwed into place through the coil assembly mounting holes with the screws penetrating the coil assembly mounts. If need be, a user can change out the coil assembly at some point in the future. If due to wear or malfunction, the coil assembly can be unscrewed and a new part re-installed.

Figure 6:
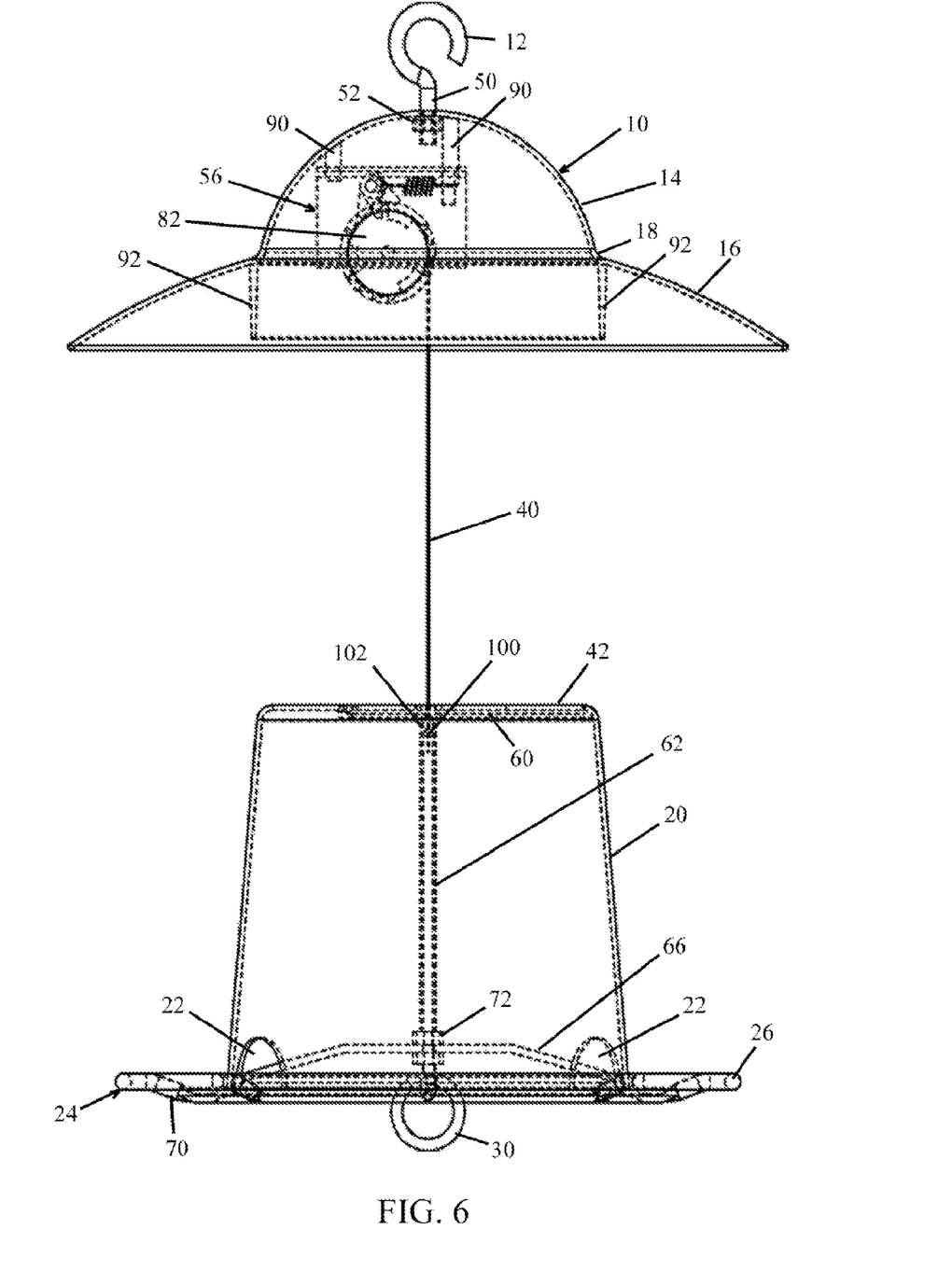
FIG. 6 is a front elevational view of the preferred embodiment of the bird feeder of FIG. 1, showing the bird feeder in the re-supply condition and with internal components disclosed by hidden lines.
Figure 7:
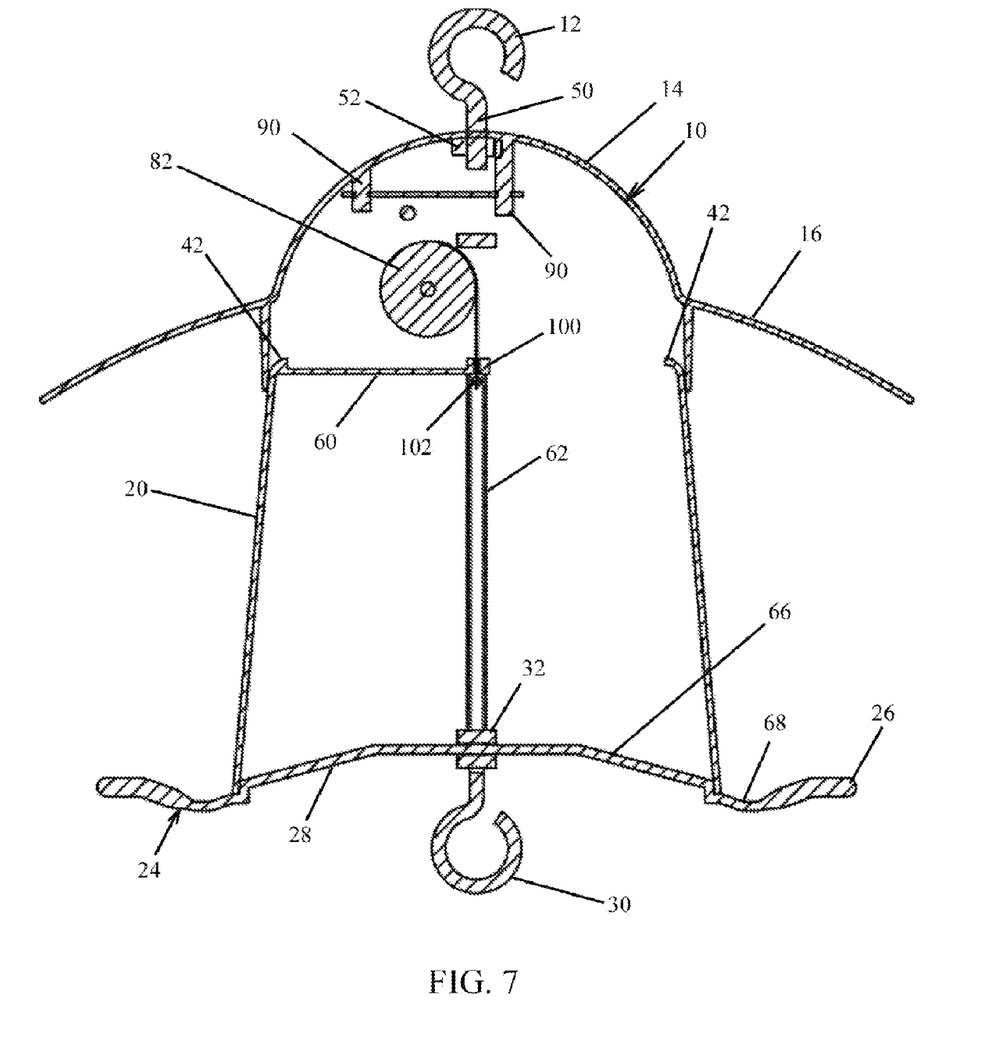
FIG. 7 is a partial cross sectional view of the bird feeder of FIG. 6, with some of the components reduced to better show the functions of the embodiment.

As may now be appreciated, the coil assembly is able to bias the cable to a position such as that shown in FIG. 7 which is termed the "in use" condition. In the in-use condition the feeder body usually has some quantity of bird feed stored inside and the coil assembly spring bias is calibrated to suspect the bottom portion adequately, keeping it in the in-use condition, even when the feeder body is full of bird seed. In this position the feeder body is held in place to the top portion, specifically where the feeder body top is wedged into the cap seat. The feeder body top has a chamfered edge that is matched for engagement with the angle of the cap seat. This fit is self aligning so when the top portion and the bottom portion are separated, such as shown in FIG. 6, and then brought back together, the top portion and the bottom portion will be oriented correctly in the in-use condition. As may be understood, the position of the top portion and the bottom portion shown in FIG. 6 is the "re-supply" condition and is typified by the removal of the bottom portion from the top portion. As may be recalled, in actual use the top portion of the bird feeder is hung from some compatible support which fixes the location of the top portion. The bottom portion, however, is free to dislocate from the top portion and can be removed to the re-supply condition at the will of the user.

With the foregoing in mind, it can be seen that the bottom portion, when in the re-supply condition, can be dislocated for some distance from the top portion, the actual length being a matter of selection. In the preferred embodiment the length is determined by a sufficient distance to allow the user to pull the bottom portion away from the top portion with enough clearance to easily access the feeder body top and thereafter fill the feeder body with seed. In contrast to some of the prior art devices, the present invention allows for lateral dislocation of the bottom portion from the top portion which enhances the access for the user.

The spring bias applied by the coil assembly is calibrated to overcome the combined weight of the bottom portion with a full load of seed. This allows the coil assembly sufficient power to retract the bottom portion and to re-engage the top portion in the select orientation to restore its function as a bird feeder. The present invention does this by locating the coil assembly in the top portion as opposed to the prior art. The location of the coil assembly in the top portion reduces weight in the bottom portion, which therefore reduces the amount of burden on the coil assembly. Reducing the weight promotes durability of the product and increases its lifetime. It also makes it somewhat easier for the user to handle as well. It also allows for a product that can carry more bird seed if desired, versus comparable units.

As is noted in the drawings, the cable end is affixed through the use of the cable anchor at the cable yoke. The location of the cable yoke is at the tube top unlike prior art device which use a lower point of connection at the tray. In fact, the usage of the tube as a conduit for the passage of the cable is indicated in the prior art and is disadvantageous not only because the location of the cable increases the amount of cable needed (adding weight and cost to the product) but it also means that where, as in the prior art, the coil assembly is located in the base or tray area of the bird feeder the cable will run through the tube and will chafe the tube causing undue wear on both the cable and the tube, shortening the lifetime of the product, and ejecting particles into the feeder body which may be deleterious to the birds using that type of feeder. Thus the present invention eliminates these pitfalls known in the prior art.

When the user approaches the bird feeder of the preferred embodiment, he/she can cause the dislocation of the bottom portion by grasping the bottom portion at the ring. The ring is positioned underneath the tray and is shielded by the tray so as to minimize potential contact with bird feces. In contrast to other bird feeder designs where the top of the feeder is accessed for re-supply, or where both the top and the bottom portion are dislocated for access, in the case of the preferred embodiment the user remains distant from the top portion and only deals with the bottom portion which has been partially shielded from bird droppings by means of the cap and shield. Thus the approach in the present invention provides a much more hygienic method for dealing with bird feeders.

It can be understood that the coil assembly in the preferred embodiment could be located to the bottom portion of the bird feeder. While this would result in the loss of some benefits of the invention, other benefits of the invention would be retained. For instance, additional weight would be placed upon the bottom portion but the bottom portion would still retain the ability to dislocate separate from the top portion which would remain fixed. The bottom portion would self align with the top portion as before when being returned to the in-use condition and a ring would still be the preferred means for the user to grasp the bottom portion. This embodiment is discussed below.

Figure 8:
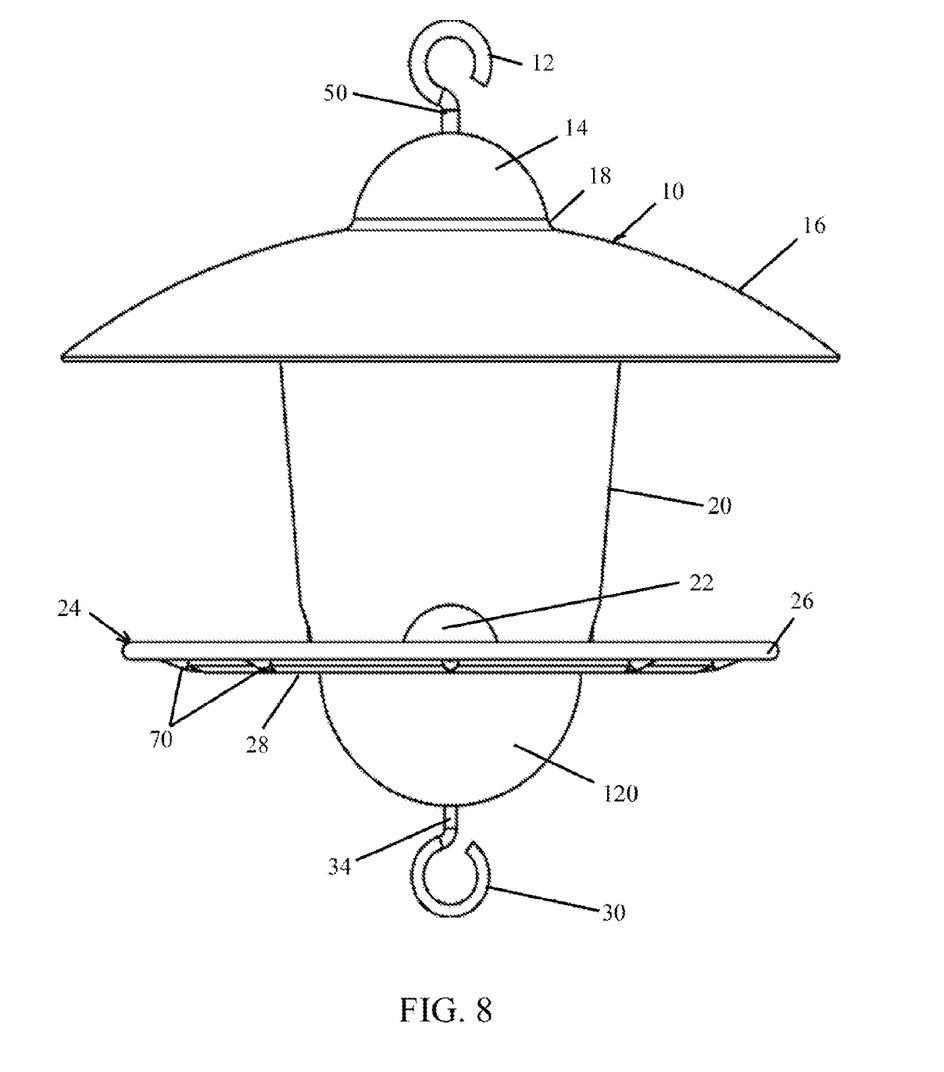
FIG. 8 is a front elevational view of a second embodiment of the present invention shown in the in-use condition.
Figure 9:
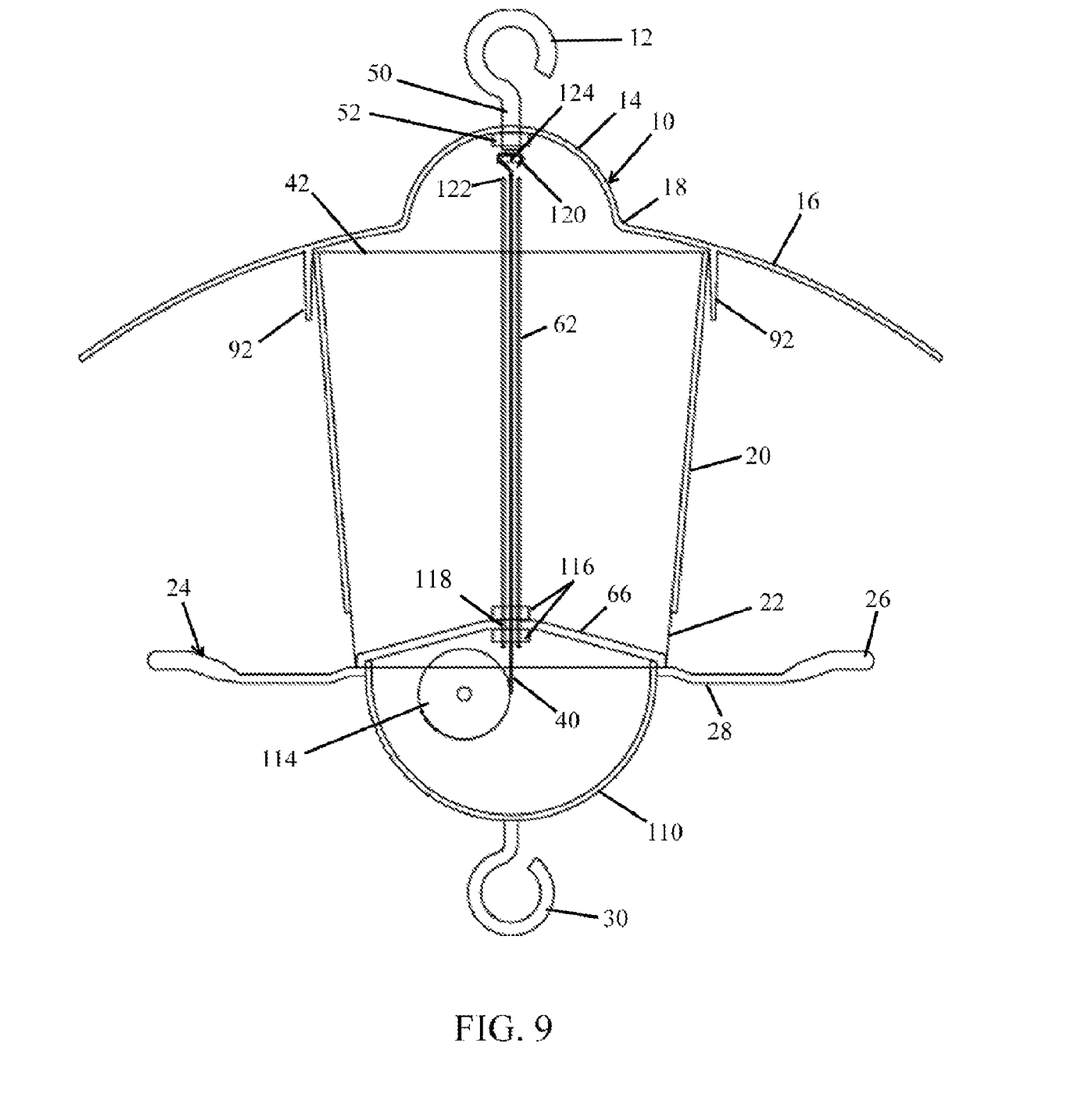
FIG. 9 is a partial cross sectional view of the bird feeder of FIG. 8 disclosing the basic components of the bird feeder and how these are oriented.
Figure 10:
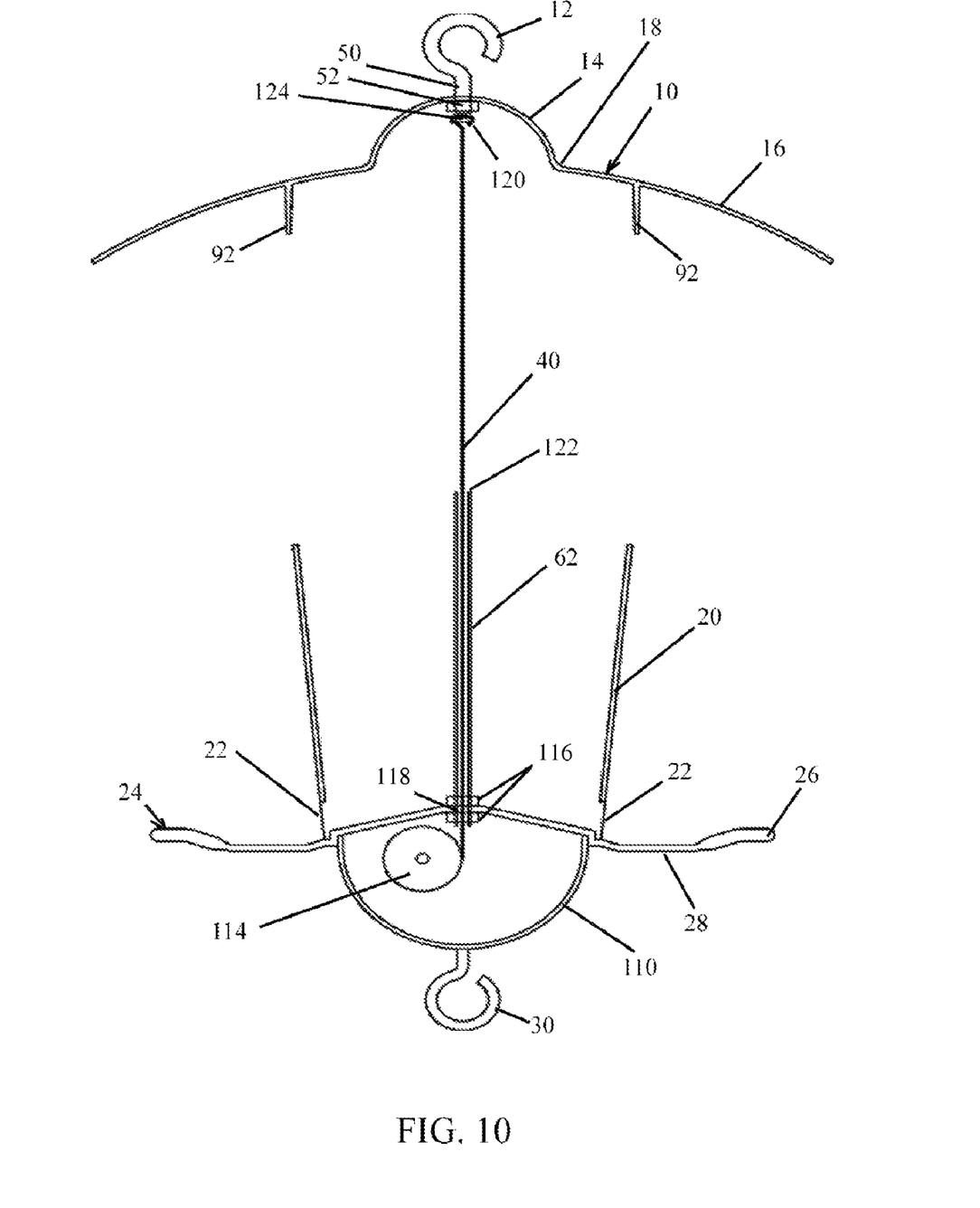
FIG. 10 is a partial cross sectional view of the bird feeder of FIG. 8 shown in the re-supply condition.

Turning now to FIGS. 8, 9 and 10, an alternate embodiment of the present invention is shown with bird feeder 10, employing in this instance, a base 110, tube 112, spool 114, nuts 116, base opening 118, cable end 120, tube top 122, and hook end 124. In this version the coil assembly (signified by the spool) is located in the bottom portion of the bird feeder. And the cable runs through the tube and is affixed to the hook at the hook end. Thus the hook end becomes an alternate attachment point for the cable end with respect to the first embodiment disclosed herein. This embodiment does not rely on the cable support to stabilize the tube since the tube is not participating in the anchoring of the cable. The cable is anchored at the hook end through the use of a cable end that engages the hook end.

Functionally, this embodiment still allows the user to dislocate the bottom portion from the top portion as described above, retaining the same benefits for this capability. The bottom portion though is burdened with the additional weight of the coil assembly and to some extent by some additional length of cable.

The teachings of the present invention, by and through its embodiments, are meant to be illustrative of the ways that the invention can be practiced. It is not meant to be limiting or restrictive in anyway.

We claim:

1. A refillable bird feeder for feeding birds with bird food, said bird feeder comprising:
   a top portion with a cap, a hook, a shield, and a coil assembly, with said hook mounted onto said cap and projecting upwards with said shield integrally formed around said cap, said hook being compatible for hanging from a support, and where said coil assembly is mounted inside of said cap and providing spring biased spooling for a cable;
   a bottom portion with a feeder body, a tray and a ring, where said feeder body includes an attachment point for a cable end;
   a cable interconnecting said top portion and said bottom portion, wherein one end of said cable is affixed to said coil assembly and is spooled thereon, and where the opposing end of said cable is affixed to said bottom portion at said attachment point; and
   wherein said top portion remains in place and said bottom portion is able to reversibly dislocate between an in-use condition and a re-supply condition, and wherein in the re-supply condition the user has access to said feeder body for the refilling of said feeder body with bird food.

2. The bird feeder of claim 1, wherein said feeder body includes a feeder body top that is chamfered and where said cap includes a cap seat that is oriented to engage said feeder body top when in the in-use condition and where the angle of said cap seat is matched for engagement with said chamfered top portion.

3. The bird feeder of claim 1, wherein said attachment point includes a tube, cable supports, and a cable yoke, where said cable is affixed to said cable yoke by a cable anchor, said attachment point being located in substantial alignment with said top portion.

4. The bird feeder of claim 1, wherein said ring is located underneath said tray.

5. A refillable bird feeder for feeding birds with bird food, said bird feeder comprising:
   a top portion with a cap, a hook, and a shield, with said hook mounted onto said cap and projecting upwards with said shield integrally formed around said cap, said hook being compatible for hanging from a support;
   a bottom portion with a feeder body, a tray and a ring;
   a cable interconnecting said top portion and said bottom portion;
   a coil assembly with a spring bias for spooling cable on said coil assembly, said spring bias calibrated to support the weight of said bottom portion as filled with bird food, where said coil assembly is affixed to one end of said cable and the other end of said cable is affixed to an attachment point on said bird feeder;
   wherein said top portion remains in place and said bottom portion is able to reversibly dislocate between an in-use condition and a re-supply condition, and wherein in the re-supply condition the user has access to said feeder body for the refilling of said feeder body with bird food.

6. The bird feeder of claim 5, wherein said feeder body includes a feeder body top that is chamfered and where said cap includes a cap seat that is oriented to engage said feeder body top when in the in-use condition and where the angle of said cap seat is matched for engagement with said chamfered feeder body top.

7. The bird feeder of claim 5, wherein said ring is located underneath said tray.

8. The bird Feeder of claim 5, wherein said attachment point is located on said top portion and said coil assembly is coupled to said bottom portion.

9. The bird feeder of claim 5, wherein said attachment point is located on said bottom portion and said coil assembly is coupled to said top portion.

10. A refillable bird feeder for feeding birds with bird food, comprising:
    a top portion with a cap, a hook, and a shield, wherein said hook mounted onto said cap and projecting upwards with said shield integrally formed around said cap, said hook being compatible for hanging from a support;
    a bottom portion with a feeder body, a tray and a ring, where said feeder body includes an attachment point for a cable end;
    a cable interconnecting said top portion and said bottom portion;
    a coil assembly mounted in said top portion and with a spring bias for spooling cable on said coil assembly, said spring bias calibrated to support the weight of said bottom portion as filled with bird food, where said coil assembly is affixed to one end of said cable and the other end of said cable is affixed to the attachment point on said bottom portion;
    wherein said attachment point includes a tube, cable supports, and a cable yoke, where said cable is affixed to said cable yoke by a cable anchor, said attachment point being located in substantial alignment with said feeder top portion, and the dislocation of said top portion and said bottom portion occurs where said top portion remains in place and said bottom portion is able to reversibly dislocate between an in-use condition and a re-supply condition, and in the re-supply condition the user has access to said feeder body for the refilling of said feeder body with bird food.

11. The bird feeder of claim 10, wherein said ring is located underneath said tray.

12. The bird feeder of claim 10, wherein said feeder body includes a feeder body top that is chamfered and where said cap includes a cap seat that is oriented to engage said feeder body top when in the in-use condition and where the angle of said cap seat is matched for engagement with said chamfered feeder body top.

13. The bird feeder of claim 10, wherein said tube is supported by said cable supports.

14. The bird feeder of claim 10, wherein said cable yoke is located at an upper end of said bottom portion.

15. A refillable bird feeder comprising:
- a top portion including a cap;
- a bottom portion including a feeder body configured to store and dispense bird food, wherein said bottom portion is selectively movable between (i) an in-use position at said top portion and (ii) a re-supply position in which said bottom portion is spaced from said top portion to permit a user to refill said feeder body with bird food;
- a spring-biased coil assembly mounted at one of said top portion and said bottom portion;
- a spooled line interconnecting said top portion and said bottom portion, said line having one end portion spooled at said coil assembly and an opposite end portion coupled to the other of said top portion and said bottom portion; and wherein when said bottom portion is in the re-supply position said line is at least partially unspooled from said coil assembly, and wherein when said bottom portion is in the in-use position said feeder body is substantially closed by said cap and retained there by said coil assembly and said line.

16. The bird feeder of claim 15, wherein said opposite end portion of said spooled line is coupled to an attachment point at the other of said top portion and said bottom portion, said attachment point comprising a tube and a cable support for supporting said tube.

17. The bird feeder of claim 16, wherein said opposite end portion of said spooled line is at least partially disposed in said tube.

18. The bird feeder of claim 15, wherein said feeder body includes a feeder body top that is chamfered and said cap includes a cap seat that is oriented to engage said feeder body top when said bottom portion is in the in-use position, and said cap seat defines an angle that is matched for engagement with said chamfered feeder body top.

* * * * *